United States Patent [19]
Evans et al.

[11] 3,861,714

[45] Jan. 21, 1975

[54] BICYCLE RACK SUPPORT

[76] Inventors: Thomas K. Evans, 4521 Graywood, Long Beach, Calif. 90808; Russell E. Broeker, 5383 Ocana Ave., Lakewood, Calif. 90713

[22] Filed: Apr. 4, 1974

[21] Appl. No.: 457,929

[52] U.S. Cl. ............... 280/202, 188/24, 224/31
[51] Int. Cl. ............... B62j 23/00, B62j 7/04
[58] Field of Search ...... 280/202, 281, 289; 188/24, 188/25, 26, 27; 224/30 R, 31, 32 R, 32 A, 39, 33 R, 33 A, 37

[56] References Cited
UNITED STATES PATENTS
2,809,053  10/1957  Pletscher ..................... 280/281

FOREIGN PATENTS OR APPLICATIONS
713,704   8/1954   Great Britain ............... 224/39 R
63,671    1/1938   Norway ........................ 224/33 R
848,565   9/1960   Great Britain ............... 224/30 R
603,012   6/1948   Great Britain ............... 224/30 R
911,876   6/1961   Great Britain ............... 188/24

*Primary Examiner*—Kenneth H. Betts
*Assistant Examiner*—Jack D. Rubenstein
*Attorney, Agent, or Firm*—Fulwider, Patton, Rieber, Lee & Utecht

[57] ABSTRACT

A spacer interposed between the front end of a bicycle rack and a boss member on the bicycle frame to prevent such bicycle rack from slipping downwardly into engagement with the cable bridle of the rear wheel brake unit.

4 Claims, 8 Drawing Figures

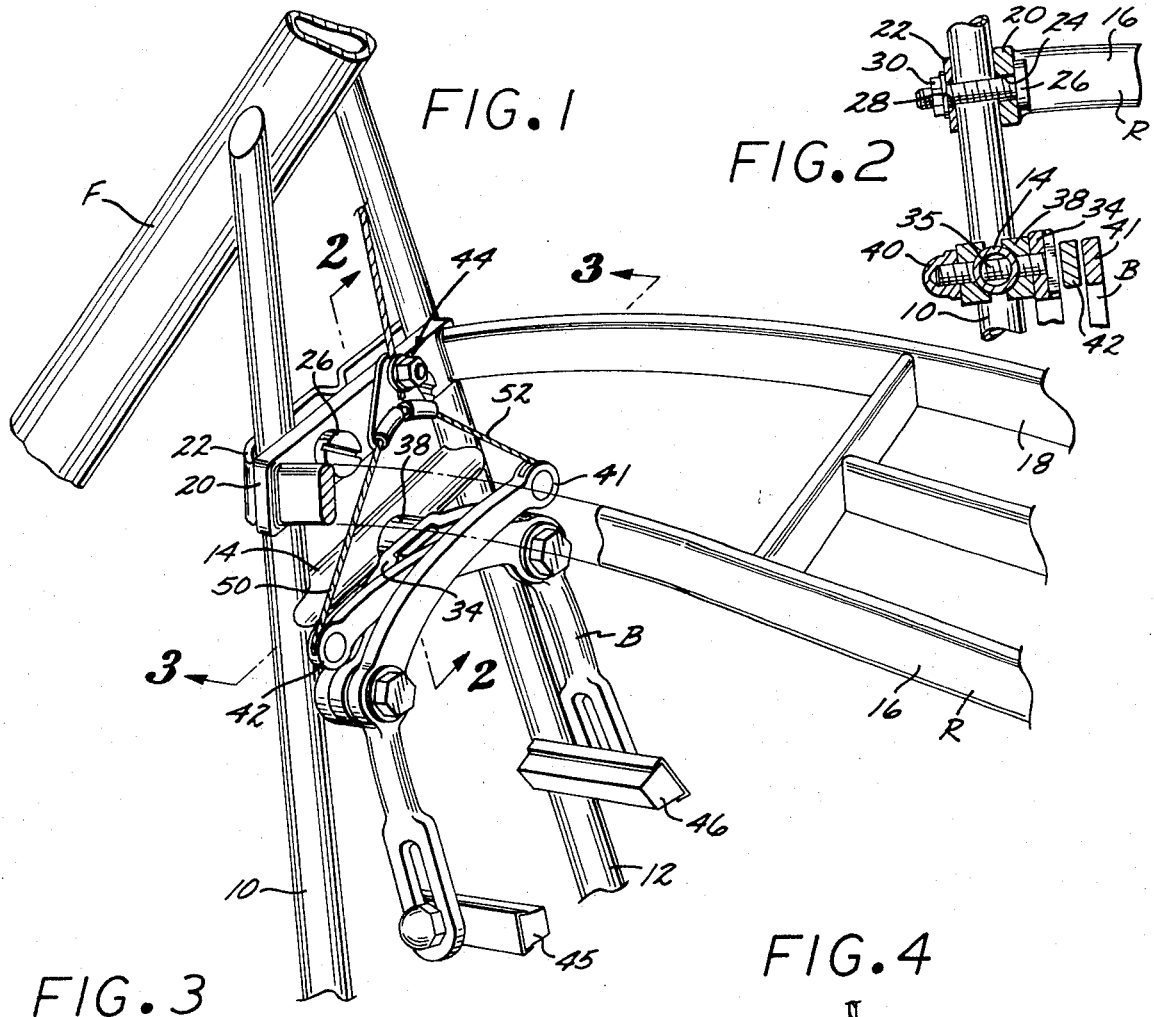
FIG. 1
FIG. 2
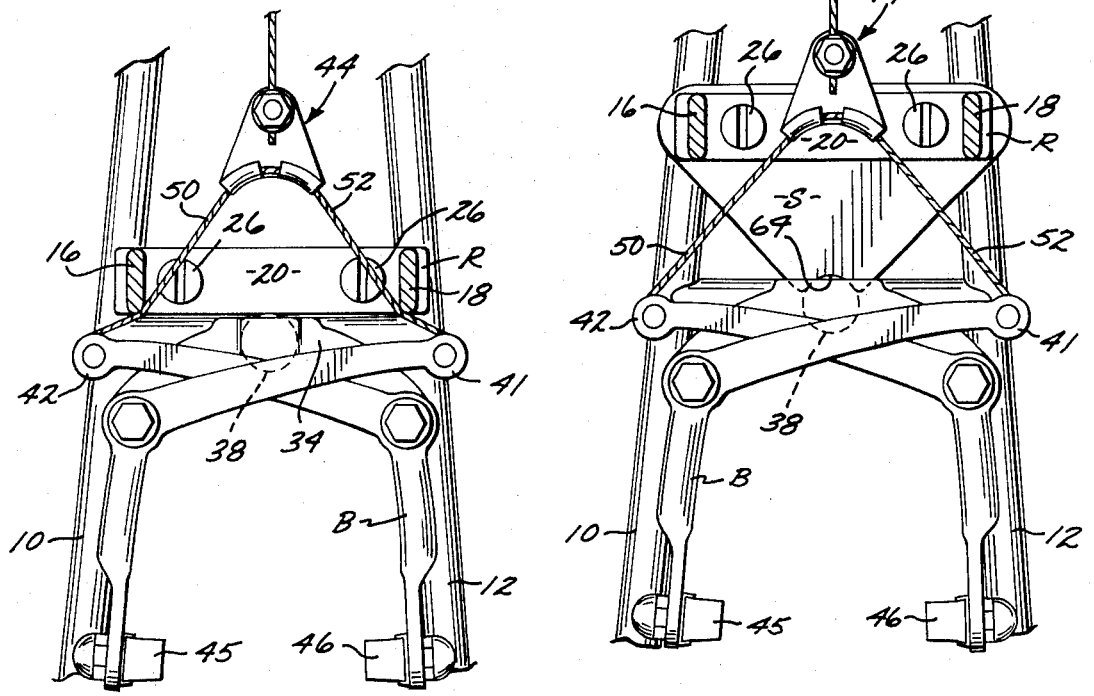
FIG. 3
FIG. 4

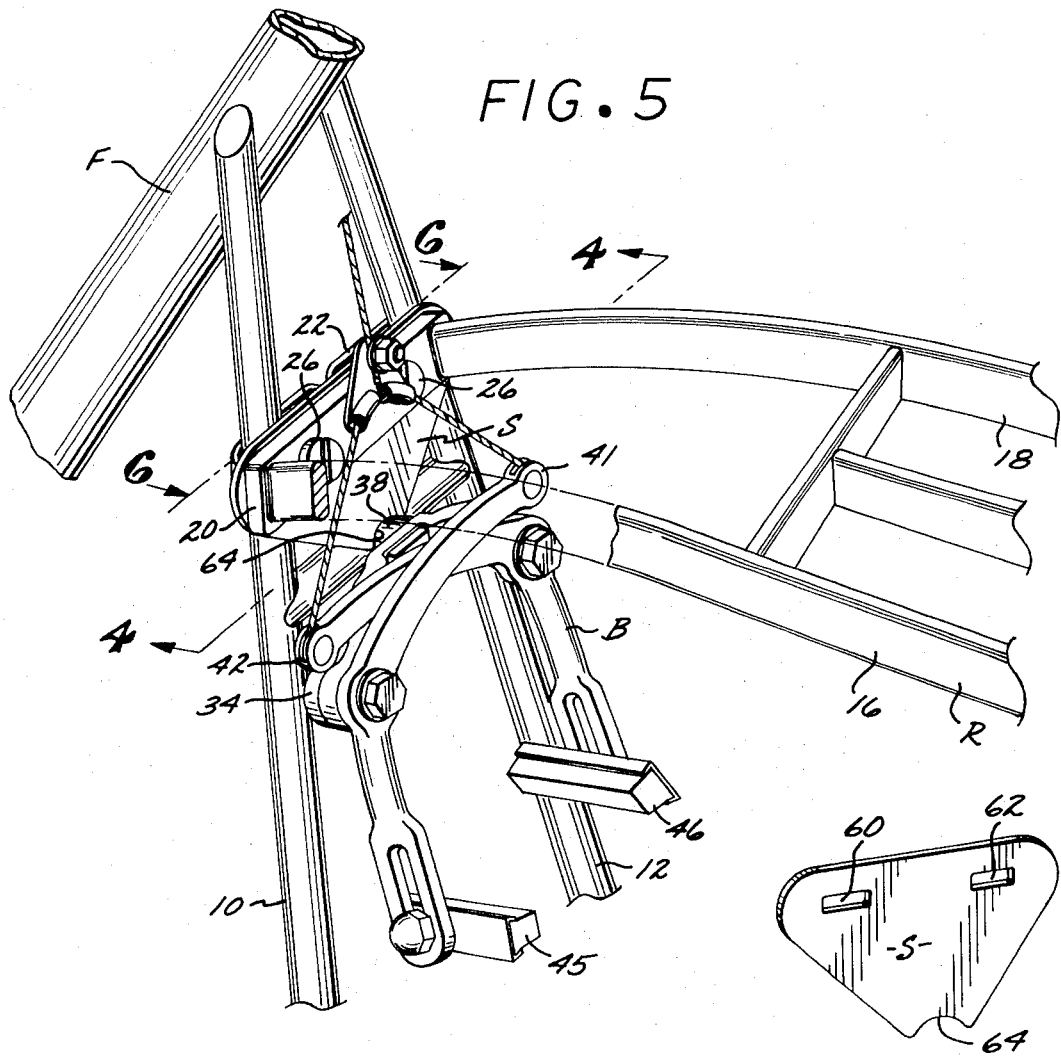
FIG. 5
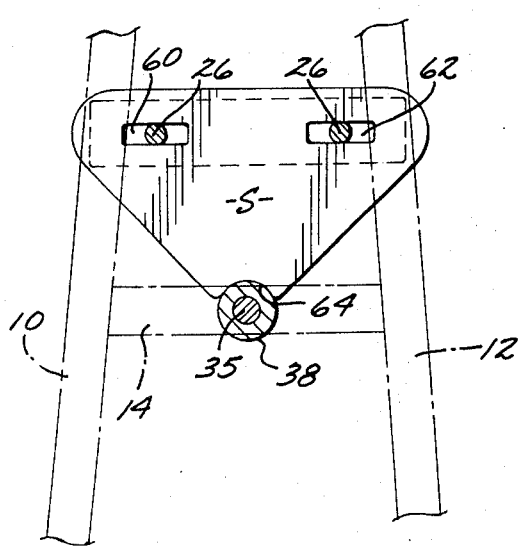
FIG. 6
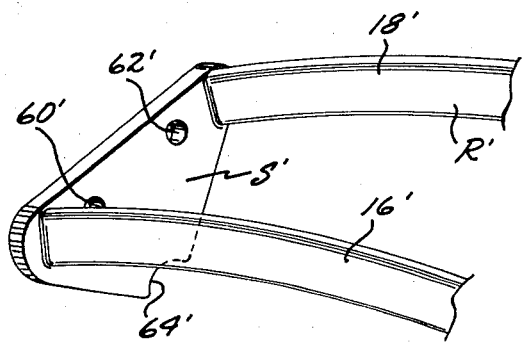
FIG. 7
FIG. 8

BICYCLE RACK SUPPORT

BACKGROUND OF THE INVENTION

Many bicycles currently in use utilize a rear brake unit mounted on the rear portion of the frame and having a pair of tire-engaging pads. Where the bicycle is equipped with a rear luggage rack, the front end thereof is generally clamped to the same frame member that supports the brake pad unit. The cable bridle of the brake pad assembly extends between the front portion of the arms defining the rack. Should the clamp slip downwardly, as when weight is applied to the rack, the rack will engage the cable bridle and prevent application of the brake. This can result in a dangerous situation.

SUMMARY OF THE INVENTION

It is a major object of the present invention to provide a spacer that is interposed between a bicycle frame and a rack utilized therewith to positively prevent interference of the bicycle rack with the operation of the rear brake.

A more particular object of the present invention is to provide a spacer of the aforedescribed nature which is universally adaptable to the majority of existing bicycles.

Yet a further object of the present invention is to provide a spacer of the aforedescribed nature which is extremely economical to manufacture and may be installed without requiring special tools or skilled labor.

These and other objects and advantages of the present invention will become apparent from the following detailed description, when taken in conjunction with the appended drawings.

DESCRIPTION OF THE DRAWINGS

FIG. 1 is a broken perspective view showing a conventional bicycle provided with a rear rack and a rear brake unit;

FIG. 2 is a vertical sectional view taken on line 2—2 of FIG. 1 and showing how the rack can interfere with operation of the rear brake unit;

FIG. 3 is a vertical sectional view taken on line 3—3 of FIG. 1 showing the rear rack after it has slipped downwardly;

FIG. 4 is a view similar to FIG. 3 but showing a spacer embodying the present invention mounted upon the bicycle frame, such view being taken along line 4—4 of FIG. 5;

FIG. 5 is a broken perspective view similar to FIG. 1, but showing a bicycle provided with the spacer of FIG. 4;

FIG. 6 is a vertical sectional view taken on line 6—6 of FIG. 5;

FIG. 7 is a perspective view of the spacer shown in FIGS. 4 and 5; and

FIG. 8 is a broken perspective view showing another form of spacer embodying the present invention.

DESCRIPTION OF THE PREFERRED EMBODIMENTS

Referring to the drawings and particularly FIGS. 1, 2 and 3 thereof, there is shown a conventional bicycle frame F that includes a pair of upwardly and forwardly extending posts 10 and 12. The posts extend in transverse alignment, with the upper end of the posts being closer together than the lower ends thereof. The intermediate portion of posts 10 and 12 are rigidly interconnected by a laterally extending horizontal bar 14. A conventional rack R extends rearwardly from posts 10 and 12. Rack R includes a pair of generally longitudinal arms 16 and 18 which have their front portions curved towards one another, and with the front ends of the arms being rigidly interconnected by means of a crosspiece 20. The rack crosspiece 20 is affixed to the posts 10 and 12 above crossbar 14 by means of a horizontal clamp plate 22. As indicated particularly in FIG. 2, crosspiece 20 is provided with a pair of apertures 24 that receive forwardly extending bolts 26, while clamp plate 22 is provided with a pair of bores 28 aligned with bores 24. Each bolt 26 receives a nut 30 disposed forwardly of clamp plate 22.

With continued reference to FIGS. 1 and 2, a rear brake unit B is positioned rearwardly of posts 10 and 12. Brake unit B includes a yoke 34 which has its mid-portion affixed to the mid-portion of crossbar 14 by means of a fastening arrangement that includes a rearwardly projecting boss element 38 carried by the mid-portion of the crossbar 14, a threaded stud 39 extending forwardly from yoke 34 through boss 38 to receive a nut 40. Yoke 34 supports a pair of crossed brake pad cranks 41 and 42. The outer ends of brake pad cranks 41 and 42 are affixed to the lower ends of a bifurcated cable bridle, generally designated 44. The opposite ends of cranks 41 and 42 carry brake pads 45 and 46. Referring to FIG. 1, it should be understood that normally the clamp plate 22 and the bolts 26 and nuts 30 secure the front end of rack R in position spaced above the crossbar 14 sufficiently far enough that sections 50 and 52 of cable bridle 44 are clear of legs 16 and 18 of the rack R.

Referring now to FIG. 2, it often occurs with the arrangement shown in FIG. 1 that clamp plate 22 becomes loosened and permits the front end rack R to slip downwardly, particularly when weight is applied to the rack.

Upon such occurrence, the legs 16 and 18 of the rack engage sections 50 and 52 of cable bridle 44 so as to restrain the cable bridle 44 from moving upwardly when the rider attempts to apply the rear brakes. Accordingly, the brake pads 45 and 46 cannot engage the bicycle's rear tire. It will be clearly appreciated that failure of the rear brake unit B to operate can readily result in a dangerous situation. This is especially true where the bicycle rider has no prior warning that such malfunction will occur.

Referring now to FIGS. 4-7, there is shown a spacer plate S embodying the invention and adapted to positively prevent the aforementioned malfunction of the rear brake assembly. Spacer plate S is of generally triangular configuration and may be formed of any suitable rigid material, such as metal or plastic. The upper portion of spacer plate S is provided with a pair of elongated slots 60 and 62, while the lower end thereof is formed with an upwardly extending arcuate recess 64. Spacer plate S may be readily installed upon bicycle frame F by merely removing bolts 26 from rack crosspiece 20 and clamp plate 22. Thereafter, the lower end of the spacer plate S is placed over frame boss 38, with the recess 64 engaging the upper surface of such boss. Next, bolts 26 are again inserted through the rack crosspiece 20 and are moved forwardly through the slots 60 and 62 of the spacer plate. The clamp plate 22 is then slipped over bolts 26 and nuts 30 applied to the latter. With the lower end of the spacer plate resting upon boss 38, the bolts 26 are then tightened and the installation of the spacer plate is complete.

Referring now to FIGS. 4 and 5, it will be clear that the spacer plate S is so dimensioned as to positively maintain the front portion of rack legs 16 and 18 above cable bridle sections 50 and 52, even if clamp plate 22 fails to hold the front end of rack R in its normal position. Hence, sections 50 and 52 of cable bridle 44 will always remain free of rack legs 16 and 18. It will also be clear that spacer plate S may be readily installed without the use of special tools and without requiring skilled labor. Additionally, the spacer plate S can be mass-produced at low cost. It is an important feature of the present invention that the elongated configuration of slots 60 and 62 permit the spacing of bolts 26 to be varied as required by different types of bicycles. The shape of the arcuate recess 64 will also conform to different diameters of bosses 38.

Referring now to FIG. 8, there is shown a second form of spacer plate S' embodying the present invention. In this form of the invention the rear surface of spacer plate S' is rigidly secured to the front end of bicycle rack legs 16' and 18'. With this arrangement the upper portion of spacer plate S' serves the function of conventional rack crosspiece 20 shown in FIGS. 1–7.

Various other modifications and changes may be made with respect to the foregoing detailed description without departing from the spirit of the present invention or the scope of the following claims.

We claim:

1. In the combination that includes a bicycle frame having a pair of posts connected by a horizontal bar, a rack extending rearwardly from said posts and having a pair of generally horizontal legs rigidly interconnected at their front ends by a crosspiece; a clamp plate securing the front ends of said arms to said posts, a pair of bolts connecting said crosspiece to said clamp plate, a rear brake unit that includes a yoke connected at its mid-portion affixed to a boss carried by said bar, and a brake cable bridle having a pair of sections normally extending downwardly and outwardly immediately below the front portion of said legs, a spacer plate formed at its upper portion with a pair of apertures that receive said bolts so as to be secured to said frame with the bottom of said plate resting upon said boss, said spacer plate being dimensioned so as to positively maintain the front portion of said legs above said brake cable bridle elements.

2. The combination of claim 1 wherein the lower portion of said spacer plate is formed with an upwardly extending arcuate recess that engages said boss.

3. The combination of claim 2 wherein the apertures of said spacer plate are elongated.

4. The combination of claim 1 wherein the apertures of said spacer plate are elongated.

* * * * *